L. P. X. JEANNET.
THERMOMETER OPERATED BY THE PRESSURE OF SATURATED VAPOR.
APPLICATION FILED APR. 18, 1918.

1,343,454.                                                    Patented June 15, 1920.

Inventor,
L. P. X. Jeannet.
By H. R. Kerslake
Atty.

UNITED STATES PATENT OFFICE.

LAZARE PIERRE XAVIER JEANNET, OF PARIS, FRANCE.

THERMOMETER OPERATED BY THE PRESSURE OF SATURATED VAPOR.

1,343,454.     Specification of Letters Patent.     Patented June 15, 1920.

Application filed April 18, 1918. Serial No. 229,353.

*To all whom it may concern:*

Be it known that I, LAZARE PIERRE XAVIER JEANNET, a citizen of the French Republic, and residing at No. 326 Rue St. Jacques, Paris, France, engineer, have invented certain new and useful Improvements in or Relating to Thermometers Operated by the Pressure of Saturated Vapor, of which the following is a specification.

This invention consists in improvements in thermometers of the type wherein the temperature is indicated by a pressure gage that is connected hydraulically to a thermometric reservoir immersed in the medium of which it is desired to measure the temperature, said reservoir containing a volatile liquid in the presence of its saturated vapor.

There are two classes of this type of thermometer:

The first class comprises such thermometers for measuring temperatures that are lower than the temperatures of the surrounding medium (in general the ordinary atmosphere) in which the pressure gage and the connecting piping are immersed. This class of thermometers comprises two liquids, namely, the transmitting liquid which is a liquid of low volatility, for instance water or mercury, and the thermometric liquid which is always a liquefied gas for instance methyl chlorid or carbon dioxid.

The second class of thermometers is more particularly designed for measuring temperatures higher than the surrounding medium. This class of thermometers may comprise only a single liquid filling the pressure gage, the connecting piping and also a portion of the thermometric reservoir.

In order that the transmitting liquid shall always transmit correctly the pressure of the saturated vapor exising in the thermometric reservoir, irrespectively of the position and inclination which this reservoir may assume, it has been proposed in these two classes of thermometers, to make the transmitting pipe open in the middle of the interior of the thermometric reservoir and to charge this reservoir with such a quantity of transmitting liquid as will insure that the said pipe will always open into the midst of the said liquid. With such an arrangement, it is then necessary to make the charge of transmitting liquid appreciably greater than the half of the reservoir, owing to the fact that if the temperature of the surrounding air in which the pressure gage and the connecting piping are situated, should fall, the transmitting liquid will contract and its level in the reservoir will sink, and thus leave very little room in the said reservoir of thermometers of this type for the volatile liquid and the vapor space. In consequence of this, in thermometers of this type comprising two liquids, owing to the very great expansion of liquefied gases, the vapor space will finally disappear at a determined temperature and the reservoir fills completely with liquid. In such a case not only will the thermometer no longer give exact indications, but it will have become deteriorated.

Single-liquid thermometers of this type are still more liable to this risk because then the total quantity of the transmitting liquid inclosed in the reservoir will be in a state of superheat, and will thereby experience an expansion that increases with the temperature and that reaches a very high value in the neighborhood of the critical point. For this reason, at present the graduations of such apparatus are limited so as to avoid causing them to work in the neighborhood of the critical point of the thermometric liquid.

It has also been proposed to terminate the transmitting pipe before reaching the thermometric reservoir, by one or more capillary tubes. This construction has some advantages in the case of thermometers for high temperatures because the capillary tube, which is colder than the reservoir, is then filled by condensation of the thermometric liquid which is unable to fall back into the reservoir. But in the case of low temperature thermometers it has the drawback of allowing the vapor chamber to extend into the capillary tube which is thereby filled with superheated vapor of the thermometric liquid, which would give rise to error in transmitting the pressure from the reservoir to the pressure gage. These causes of error would disappear if the transmission of the pressure from the reservoir to the pressure gage is effected hydraulically from one end to the other.

One object of the present invention is to reduce considerably the quantity of transmitting liquid which it is necessary to introduce into the reservoir for the purpose of assuring a hydraulic connection with transmitting pipe and of maintaining the vapor chamber always in the interior of the medium into which the reservoir is immersed. For this purpose it is proposed to extend the pipe coming from the pressure gage, by a capillary tube fitting closely the interior or exterior of the reservoir, the capacity and filling of said capillary tube being such that the free level of the transmitting liquid will be situated always between the two ends of said capillary tube, that is to say, in the medium in which the reservoir is immersed.

By this means the greater portion of the reservoir is left free to contain the thermometric liquid proper and to form the vapor space of said liquid.

The accompanying diagrammatic drawings illustrate by way of example two constructional forms of a thermometer according to this invention.

Figure 1:
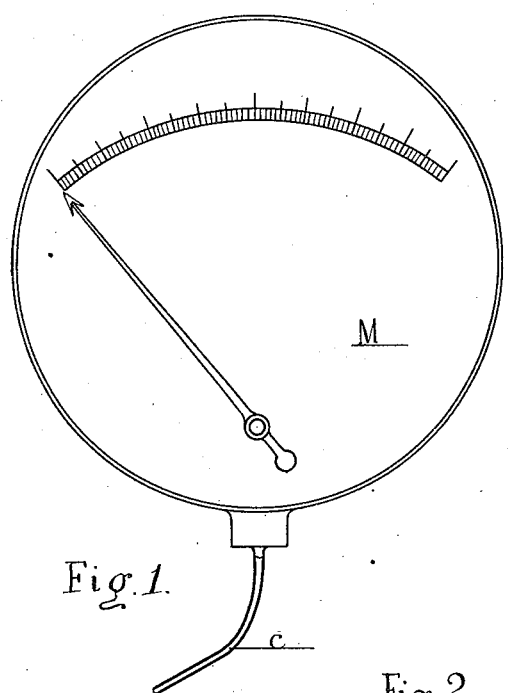
Figure 1 is a longitudinal section of one form.

Referring first to Fig. 1:

The pressure gage tube communicates by way of its union box M with the connecting piping $c$ of any desired diameter and length which enters at $e$ in the thermometric reservoir $r$ in the interior of which it is prolonged in the form of a capillary pipe $t$ which is folded to-and-fro back upon itself in the form of a bundle, and is open at its end $e'$. The pressure gage tube, the connecting piping $c$, and a portion of the narrow pipe $t$ are filled with the transmitting liquid. The reservoir $r$ is charged with the desired quantity of thermometric liquid $v$. R is the space filled with the saturated vapor of said liquid.

When the reservoir $r$ is immersed in the medium of which it is desired to measure the temperature, the saturated vapor of the liquid $v$ transmits its pressure upon the free level of the transmitting liquid situated at a point in the pipe $t$, and which is maintained in said pipe by the action of capillary forces, and the temperature will be indicated by the pressure gage.

The two main conditions to be satisfied in order that the free level of the transmitting liquid shall remain always in the pipe $t$, are the following:

(1) The pipe $t$ must be filled to the extent of one half its capacity when the said liquid is at its mean temperature, and (2) The capacity of the pipe $t$ must be at least equal to the increase in volume experienced by the whole of the transmitting liquid when the various parts of the thermometer (the pipe $t$, the connecting piping $c$, and the pressure gage) that contain it, shall pass each from the lowest temperature to the highest temperature to which they may have to be subjected. This increase in volume is extremely small in proportion to the ordinary capacities of the reservoirs $r$ in this type of thermometer.

In calculating the capacity of the pipe $t$, there should be taken also into consideration other factors of less importance which are however capable of varying the level of the transmitting liquid in the interior of the said pipe, such as, for example, the variations of the capacity of the manometric pipe when the pressure varies; likewise the variations in the capacity of the piping which is generally coiled in filling and then uncoiled to be put in place and, finally, the variation in the volume of that portion of the thermometric liquid that is contained in the pipe $t$; these variations are not negligible in the case of considerable variations of temperature.

It is also very important to note that the pipe $t$ which is subjected inside and outside to the same pressure, may be made with very thin walls, and thus occupies a very small space in the reservoir so that the greater portion of the reservoir $r$ will be left available to serve as the vapor space R.

Figure 2:
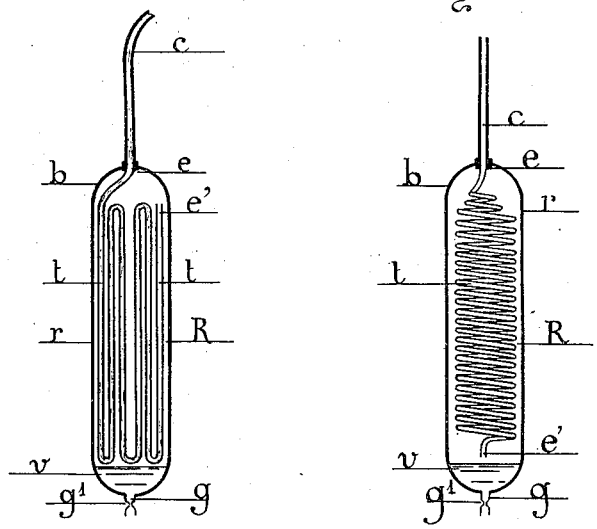
Fig. 2 is a longitudinal section of the second form.

The constructional form illustrated in Fig. 2 differs from that shown in Fig. 1 by the fact that the pipe $t$ has the form of a closely wound coil.

For the purpose of facilitating the charging of the thermometer, the reservoir $r$ may be made in two parts, in which case the top portion $b$ may be fixed to that end of the connecting piping $c$ which is extended in the form of the narrow pipe $t$. By separating these two parts of the reservoir, the whole $M$-$c$-$t$ can be easily charged with the transmitting liquid, care being taken that the free level shall be situated approximately at the middle of the pipe $t$ when the whole is at the mean temperature to which it may have to be subjected. The two parts of the reservoir $r$ are then assembled, for instance by means of screw-thread and a soldered joint. Finally, the volatile liquid $v$ is charged into the reservoir $r$ by way of its lower tube $g$ with the usual precautions, and the reservoir is closed by sealing the tube $g$ at $g^1$.

The narrow pipe $t$ which forms the extension of the connecting piping $c$, may, without departing from the nature of this invention, be arranged outside the reservoir $r$, and closely fitted to it in such a manner as to be immersed always in the same medium as it is, and enter the latter so as to open at its end $e^1$ inside the said reservoir, provided of course that the pipe $t$ shall always contain the free level of the transmitting liquid.

The principal advantages of the thermometer according to this invention compared with the hitherto known thermometers of this type are the following:

(1) The vapor space is always relatively large. Consequently there is no risk of its being filled up by the liquid, nor of the thermometer becoming deteriorated. Further, the thermometer may be used up to the critical point of the thermometric liquid, and therefore it may be graduated throughout a wide range.

(2) The reservoir $r$ may be made smaller than usual and therefore be more convenient for use, and have a greater thermal sensitiveness.

(3) The quantity of transmitting liquid contained in the reservoir $r$ is so very small that all liquids that are not decomposed by heat may be employed as thermometric bodies irrespective of their expansibility.

(4) The transmitting liquid contained in the pipe $t$, and the vapor of the thermometric liquid $v$ are in contact with each other only with a very small free surface. The result of this is that there is very small risk of any physical or chemical reaction between the two. It is also to be understood that two liquids may be employed having any relative densities.

Having now particularly described and ascertained the nature of my said invention and in what manner the same is to be performed, I declare that what I claim is:—

1. A thermometer operated by the pressure of a saturated vapor, comprising a reservoir containing a volatile liquid, a pressure gage and a pipe which are filled with transmitting liquid, and a capillary tube closely fitting the contour of the reservoir, connecting said reservoir to said pipe and opening into said reservoir, said capillary tube having such a capacity and being filled to such an extent that the free level of the transmitting liquid will always be situated between its two ends irrespectively of the variations of volume of the parts of the pipe containing the transmitting liquid, and the transmitting liquid itself.

2. A thermometer operated by the pressure of a saturated vapor, comprising a reservoir containing a volatile liquid, a pressure gage and a pipe which are filled with transmitting liquid, and a capillary tube situated inside the reservoir, connecting said reservoir to the pipe and opening into said reservoir, said capillary tube having such a capacity and being filled to such an extent that the free level of the transmitting liquid is always situated between its two ends irrespectively of the variations of volume of the parts of the pipe containing the transmitting liquid, and the transmitting liquid itself.

3. A thermometer operated by the pressure of a saturated vapor, comprising a reservoir containing a volatile liquid, a pressure gage and a pipe which are filled with transmitting liquid, and a capillary tube in the form of a worm situated inside the said reservoir, connecting said reservoir to the pipe and opening into said reservoir, said capillary tube having such a capacity and being filled to such an extent that the free level of the transmitting liquid will always be situated between its two ends irrespectively of the variations of volume of the parts of the pipe containing the transmitting liquid and the transmitting liquid itself.

Dated this 13th day of December, 1917.

In testimony whereof I have signed my name to this specification.

LAZARE PIERRE XAVIER JEANNET.